United States Patent
Dalton, Jr. et al.

(10) Patent No.: US 8,240,500 B2
(45) Date of Patent: Aug. 14, 2012

(54) UNDERGROUND TANK LOCK

(75) Inventors: Robert E. Dalton, Jr., Greenville, SC (US); Matthew R. Greiner, Simpsonville, SC (US)

(73) Assignee: CompX International Inc., Greenville, SC (US)

( * ) Notice: Subject to any disclaimer, the term of this patent is extended or adjusted under 35 U.S.C. 154(b) by 432 days.

(21) Appl. No.: 12/496,796

(22) Filed: Jul. 2, 2009

(65) Prior Publication Data

US 2010/0000999 A1 Jan. 7, 2010

Related U.S. Application Data

(60) Provisional application No. 61/077,968, filed on Jul. 3, 2008, provisional application No. 61/144,223, filed on Jan. 13, 2009.

(51) Int. Cl.
*B65D 45/00* (2006.01)
*B65D 45/16* (2006.01)
*B65D 43/00* (2006.01)
*B65D 55/14* (2006.01)

(52) U.S. Cl. ........ 220/327; 220/315; 220/323; 220/325; 220/328; 220/725; 215/273; 215/280; 215/282; 70/158; 70/160; 70/162; 70/163; 70/165

(58) Field of Classification Search .................. 220/315, 220/323, 325, 327, 328, 725, DIG. 20; 215/273, 215/280, 282, 283; 70/158, 160, 162, 163, 70/165; 138/89
See application file for complete search history.

(56) References Cited

U.S. PATENT DOCUMENTS 3,477,607 A * 11/1969 Johnson, Jr. et al. ......... 220/210

* cited by examiner

*Primary Examiner* — Anthony Stashick
*Assistant Examiner* — Madison L Wright
(74) *Attorney, Agent, or Firm* — Dority & Manning, P.A.

(57) ABSTRACT

Disclosed are apparatus and methodology for securing access to an underground device such as a storage tank. A lockable blocking plate is secured to a filler cap for an underground storage tank in a manner to inhibit access to the filler cap. The locking mechanism is configured such that the lock and blocking plate may freely rotate with respect to the filler cap. The blocking plate may include a side skirt extending to cover portions of the filler cap and, optionally, portions of a standpipe and coupling for the filler cap. Free rotation is enabled by way of an annular groove in a portion of the locking mechanism, and into which groove one or more locking portions may be inserted, or by way of a freely moving swivel boss attached to the filler cap.

28 Claims, 8 Drawing Sheets

UNDERGROUND TANK LOCK

PRIORITY CLAIM

This application claims the benefit of previously filed U.S. Provisional Patent Application entitled "UNDERGROUND TANK LOCK," assigned U.S. Ser. No. 61/077,968, filed Jul. 3, 2008, and this application claims the benefit of previously filed U.S. Provisional Patent Application entitled "UNDERGROUND TANK LOCK," assigned U.S. Ser. No. 61/144,223, filed Jan. 13, 2009, both of which are incorporated herein by reference for all purposes.

FIELD OF THE INVENTION

The present subject matter relates to locks. More particularly, the present subject matter relates to apparatus and methodology for securing access to fill caps for underground liquid storage tanks.

BACKGROUND OF THE INVENTION

Typically, currently installed underground storage tanks are fitted with a locking cap and hasp mechanism. Such a hasp mechanism may be fitted with a padlock. Such type of locking arrangement is vulnerable to a variety of attack methods, including, but not limited to, bolt cutters, pry bars, lock picking, physical manipulation of ill fitting caps, unscrewing of the locked cap assembly from the tank standpipe nipple, and other methods. In the case especially of petroleum products, there is a particularly need to prevent theft of the tank contents as the cost/value of such products continues to rise.

While various implementations of underground tank locks have been developed, no design has emerged that generally encompasses all of the desired characteristics as hereafter presented in accordance with the present technology.

SUMMARY OF THE INVENTION

The present subject matter relates to locking mechanisms configured to secure access to fill caps for underground tanks, such as liquid storage tanks. In one exemplary present configuration, the present subject has particular applicability, but is not limited to, underground liquid storage tanks that store refined petroleum products such as gasoline, diesel fuel, kerosene, etc. (i.e., such products as found at typical end user fueling stations).

In accordance with present technology, an underground tank lock may be provided in the form of a blocking plate provided with a locking mechanism. The blocking plate is designed to assist in preventing theft, willful contamination, or otherwise unauthorized access for any purpose to the underground storage tank fill cap. In accordance with present disclosure, apparatus and methodologies are provided that prevent and/or limit a large variety of attack methods. In particular, in one present exemplary configuration, a locking mechanism is provided corresponding to a blocking plate which physically blocks access to the standpipe and cap assembly associated with an underground storage tank yet is itself free spinning on such assembly to prevent unscrewing of the fill cap.

In an exemplary configuration a blocking plate may be constructed from selected metals and/or engineering plastics. In one present exemplary configuration, a flat circular blocking plate may be provided. In another exemplary configuration, a skirt may be provided around the perimeter of a flat circular blocking plate to provide additional blocking protection.

In addition, the present subject matter provides a blocking plate assembly corresponding to a high security lock associated with such a blocking plate, in accordance with the present subject matter. The high security lock is configured to resist lock picking or drilling, as well as other physical attack methods.

In an exemplary configuration of the present subject matter, a lock housing may be provided and configured for secure attachment to an underground storage tank filler cap. In an exemplary configuration, the lock housing may be provided with a cap stem that may be inserted through a hole in the filler cap and secured by a nut. In a present alternative embodiment, a lock housing may be provided in accordance with the present subject matter with a plurality of holes through which bolts may be secured via tap holes within the filler cap.

The lock housing may be provided with an internal groove configured to receive one or more locking members associated with the high security lock. Provision of the inner groove, and the interaction of the locking member(s) therewith, permit continuous rotation of the blocking plate assembly upon the filler cap. In one present exemplary embodiment, such locking members may correspond to ball bearings that may be physically displaced into the internal groove by operation of the lock mechanism. In another present exemplary alternative embodiment in accordance with present subject matter, such locking member may correspond to a single lock bolt operated by a lock mechanism. In yet still further present exemplary alternative embodiments, a locking member may correspond to a lock mechanism including plural lock bolts.

One present exemplary embodiment relates to a locking mechanism for securing access to a storage tank of the type having a filler cap, comprising a boss secured to a filler cap of an associated storage tank; a blocking plate; and a locking assembly. Such locking assembly preferably is for selectively securing such blocking plate to such boss, such that such blocking plate physically blocks access to such filler cap, whereby access to the contents of such associated storage tank are protected.

In one exemplary variation of the foregoing, such boss may include a cap stem with a projecting threaded member, and a nut, cooperating with an opening formed in an associated filler cap, for securement thereto. Further optionally, such cap stem may define an annular groove; and such locking mechanism may include at least two rotatable ball bearings received in such annular groove, such that such blocking plate is secured in a free spinning position relative to such associated filler cap, so as to prevent unauthorized displacement of such filler cap.

In another present variation, such boss may include a base member defining a plurality of screw access openings therethrough, and a corresponding plurality of screws, cooperating with corresponding screw-receiving openings formed in an associated filler cap, for securement thereto.

Yet another alternative involves such locking assembly further including a rotatable interface for such blocking plate, such that such blocking plate is secured in a free spinning position relative to such associated filler cap, so as to prevent unauthorized displacement of such filler cap. Further, such blocking plate may define an opening therethrough; such locking assembly may include a housing body receivable below such blocking plate, and a lock receivable through such blocking plate opening for securement of such blocking plate to an associated filler cap; and such rotatable interface may include at least one retaining bolt. In some embodiments, such boss may include a cap stem with a projecting threaded member, and a nut, cooperating with an opening formed in an associated filler cap, for securement thereto; and such locking mechanism may further include a spring clip interconnecting such cap stem with such housing body.

In another present alternative, such boss may comprise a free moving swivel boss attached to such associated filler cap, such that such blocking plate is secured in a free spinning position relative to such associated filler cap, so as to prevent unauthorized displacement of such filler cap. Also, variations may further include a padlock with movable shackle, for cooperating with such swivel boss, for rotatable securement of such blocking plate relative to such associated filler cap. Some other alternatives may involve such blocking plate further including a depending skirt for extending to cover portions of an associated filler cap, and/or further include a handle secured to such blocking plate to facilitate removal thereof from an associated filler cap.

Yet another present exemplary embodiment may relate to a rotatable locking mechanism for securing access to an underground fuel storage tank of the type having a standpipe topped by a removable filler cap, comprising a boss secured to a filler cap of an associated storage tank; a blocking plate for physically blocking access to such standpipe and removable filler cap associated with an underground storage tank; and a locking assembly, for selectively securing such blocking plate to such boss, such that such blocking plate physically blocks access to such filler cap, whereby access to the contents of such associated storage tank are protected. Preferably, such locking assembly further includes a rotatable interface for such blocking plate, so that such blocking plate is secured in a free spinning position relative to such associated filler cap, so that such blocking plate is rotatable without causing any corresponding displacement of an associated filler cap.

In one present option of the foregoing, such blocking plate may define an opening therethrough; and such locking assembly may include a housing body receivable below such blocking plate, and a lock receivable through such blocking plate opening for securement of such blocking plate to an associated filler cap. Still further, such boss may include a cap stem with a projecting threaded member, and a nut, cooperating with an opening formed in an associated filler cap, for securement thereto; such cap stem may define an annular groove; and such locking mechanism may further include at least two rotatable ball bearings received in such annular groove, such that such blocking plate is secured in a free spinning position relative to such associated filler cap, so as to prevent unauthorized displacement of such filler cap.

In another variation of the foregoing, such boss may include a base member defining a plurality of screw access openings therethrough, and a corresponding plurality of screws, cooperating with corresponding screw-receiving openings formed in an associated filler cap, for securement thereto; and such rotatable interface may include at least one retaining bolt. Alternatively, such boss may include a cap stem with a projecting threaded member, and a nut, cooperating with an opening formed in an associated filler cap, for securement thereto; and such rotatable locking mechanism may further include a spring clip interconnecting such cap stem with such housing body.

In yet other present alternatives, such boss may comprise a free moving swivel boss attached to such associated filler cap, such that such blocking plate is secured in a free spinning position relative to such associated filler cap, so as to prevent unauthorized displacement of such filler cap; and such rotatable locking mechanism may further include a padlock with movable shackle, for cooperating with such swivel boss, for rotatable securement of such blocking plate relative to such associated filler cap. Alternatively, such blocking plate may further include a depending skirt for extending to cover portions of an associated filler cap; and such rotatable locking mechanism may further include a handle secured to such blocking plate to facilitate removal thereof from an associated filler cap.

It is to be understood by those of ordinary skill in the art that the present subject matter equally encompasses both apparatus and methodology. One present exemplary method for securing access to a storage tank of the type having a filler cap, comprises securing a boss to the filler cap of a storage tank; providing a blocking plate; and selectively securing such blocking plate to such boss through use of a locking assembly, such that such blocking plate physically blocks access to such filler cap, whereby access to the contents of such associated storage tank are protected.

Variations of such methodology may further include providing an opening in the filler cap; providing such boss so as to include a cap stem with a projecting threaded member, and a nut; and securing such nut to such projecting threaded member with such threaded member cooperating with the opening in the associated filler cap. Optionally, alternatives may further include providing such cap stem with an annular groove; and providing at least two rotatable ball bearings received in such annular groove, such that such blocking plate is secured in a free spinning position relative to such associated filler cap, so as to prevent unauthorized displacement of such filler cap.

Other present variations of such methodology may further include forming a plurality of screw-receiving openings in the filler cap; providing such boss so as to include a base member defining a plurality of screw access openings therethrough, and a corresponding plurality of screws; and securing such plurality of screws to such filler cap respectively through such screw access openings. Still others may further include providing a rotatable interface for such blocking plate, such that such blocking plate is secured in a free spinning position relative to such associated filler cap, so as to prevent unauthorized displacement of such filler cap.

Additional present alternatives of such methodology may further include providing an opening through such blocking plate; providing a housing body below such blocking plate; securing a lock to such housing body through such blocking plate opening for securement of such blocking plate to the associated filler cap; and providing at least one retaining bolt in conjunction with such rotatable interface. Variations of the foregoing methodology may further include providing an opening in the filler cap; providing such boss so as to include a cap stem with a projecting threaded member, and a nut; securing such nut to such projecting threaded member with such threaded member cooperating with the opening in the associated filler cap; and interconnecting such cap stem with such housing body with a spring clip.

Still further present variations may include providing a free moving swivel boss attached to the filler cap; and providing a padlock with movable shackle, for cooperating with such swivel boss, for rotatable securement of such blocking plate relative to the filler cap, such that such blocking plate is secured in a free spinning position relative to the filler cap, so as to prevent unauthorized displacement of such filler cap. Present methodology may further include providing such blocking plate with a depending skirt for extending to cover portions of the filler cap, and/or securing a handle to such blocking plate to facilitate removal thereof from the filler cap.

Additional objects and advantages of the present subject matter are set forth in, or will be apparent to, those of ordinary skill in the art from the detailed description herein. Also, it should be further appreciated that modifications and variations to the specifically illustrated, referenced, and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
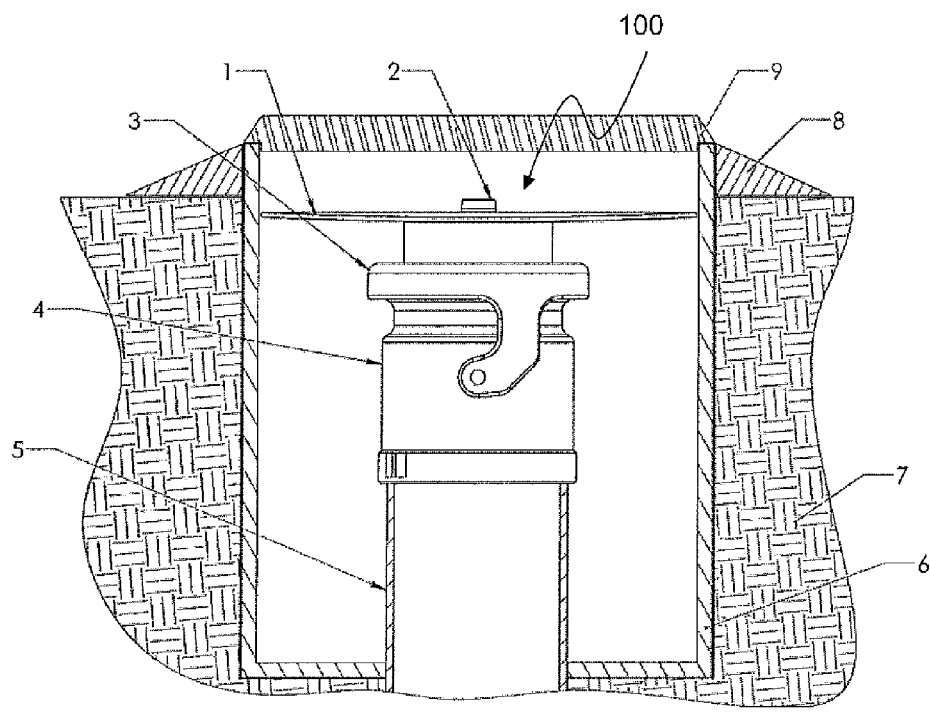
FIG. 1 illustrates a typical underground storage tank installation including an exemplary locking plate assembly in accordance with present technology.

Repeat use of reference characters throughout the present specification and appended drawings is intended to represent same or analogous features, elements, or steps of the present subject matter.

Detailed Description of the Preferred Embodiments

As discussed in the Summary of the Invention section, the present subject matter is particularly concerned with apparatus and methodologies for securing access to fill caps for underground liquid storage tanks.

Selected combinations of aspects of the presently disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of one or more other embodiments to yield yet further embodiments. Additionally, certain features may be interchanged with similar devices or features not expressly mentioned which perform the same or similar function or functions.

Reference will now be made in detail to the presently preferred embodiments of the subject underground tank access securing apparatus and methodology. Referring now to the drawings, FIG. 1 illustrates a typical underground storage tank installation including an exemplary locking plate assembly generally 100 in accordance with present technology. As illustrated in FIG. 1 as well as in various views in FIGS. 2 though 4, present exemplary locking plate assembly generally 100 corresponds to a blocking plate 1 that is provided with a high security lock 2. High security lock 2 is preferably mounted to blocking plate 1 in such a manner that only the head of the lock 2 is visible above the upwardly-facing surface of blocking plate 1. Lock 2 is configured to be used to secure blocking plate 1 to the top of filler cap 3 by way of housing body 11 and a cap stem 14 secured to filler cap 3, as is more fully described herein below.

Filler cap 3 is provided as a seal to prevent intrusion of foreign objects or other substances into the underground tank as well as to prevent the undesired release of vapors from the tank contents. Filler cap 3 is generally secured to a coupling 4 by means of a toggle action to compress the seal, as is well understood by those of ordinary skill in the art. Coupling 4 is screwed onto threaded standpipe 5, which generally provides refilling access to an underground storage tank generally there below (not separately illustrated). Standpipe 5 is typically enclosed in well housing 6 and back filled, such as with concrete, earth, and/or other filler material 7. Well housing 6 is generally provided with a flange 8 and capped with a cover 9. Blocking plate 1 per the present subject matter is fitted to provide minimal clearance to the well housing 6, thus greatly restricting unauthorized access to filler cap 3, coupling 4, and standpipe 5.

Figure 2:
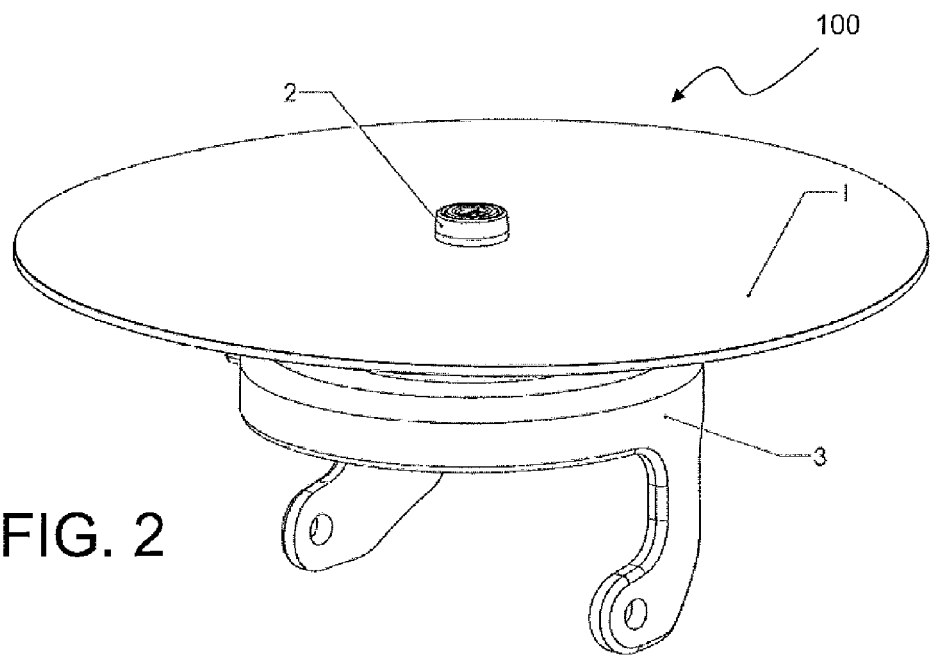
FIG. 2 is an isometric view of an exemplary locking plate assembly in accordance with present technology.

With reference now to FIG. 2, there is illustrated an isometric view of an exemplary locking plate assembly generally 100 in accordance with present technology. As may be seen from FIG. 2, a head portion of lock 2 is mounted so as to be located in the center of circular blocking plate 1.

Figure 3:
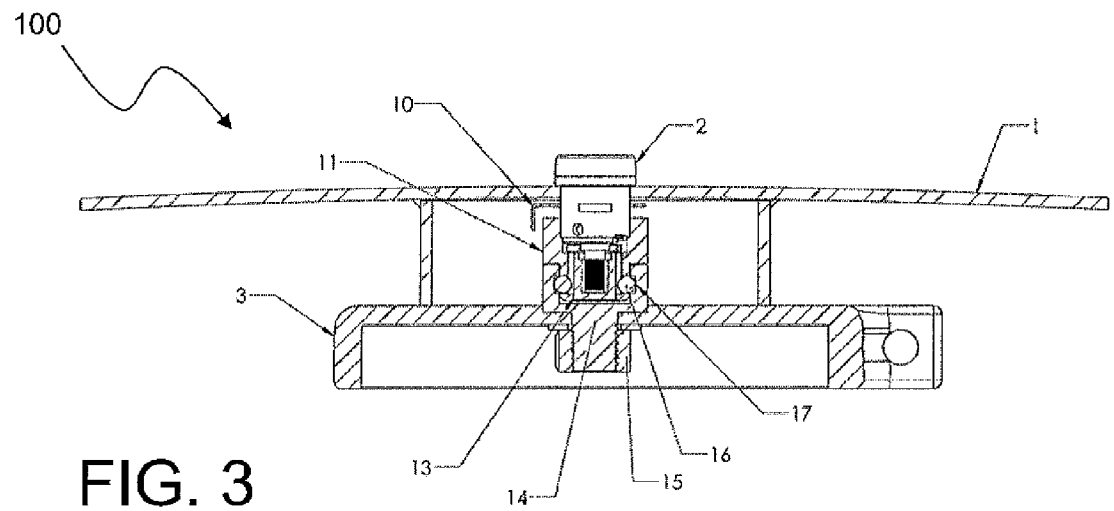
FIG. 3 illustrates a cross section of the exemplary present locking plate assembly illustrated in present FIG. 2.
Figure 4:
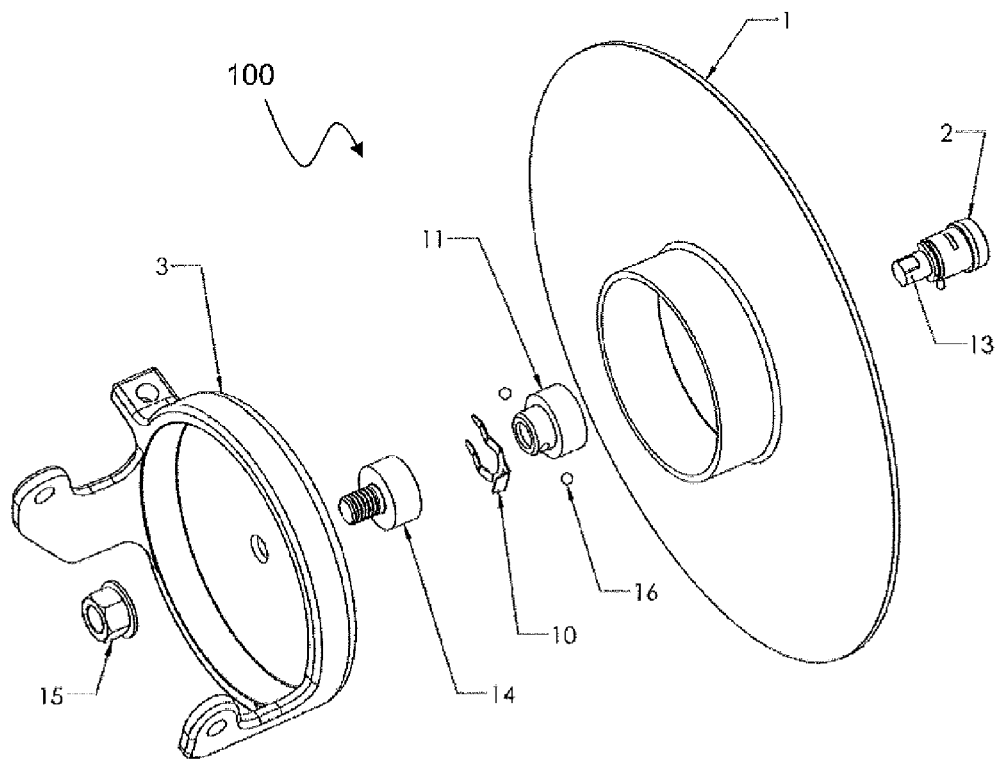
FIG. 4 is an exploded isometric view of the present exemplary locking plate of present FIG. 2.

With reference to FIGS. 3 and 4, there are illustrated cross section and exploded views, respectively, of the exemplary present locking plate assembly generally 100 and filler cap 3 as illustrated in FIGS. 1 and 2. As illustrated in particular in conjunction with present FIGS. 3 and 4, present exemplary lock 2 may be secured to blocking plate 1 by means of a specialized element, such as present exemplary spring clip 10. In alternate embodiments of the present subject matter, other elements and/or means may be employed to secure lock 2 including, but not limited to, a nut. In the present exemplary embodiment of present FIGS. 3 and 4, lock 2 is preferably provided with housing body 11, inner sleeve 13, and a pair of ball bearings 16.

By rotating the inner body of lock 2 with an appropriate key, inner sleeve 13 is rotated and forces ball bearings 16 into groove 17 of the cap stem 14. In the exemplary embodiment illustrated in present FIGS. 1 through 4, cap stem 14 is secured to the filler cap 3 by means of nut 15 or other elements or means. With the ball bearings 16 partially extended into groove 17, the housing body 11 and thus the lock 2 and blocking plate 1 are secured to cap stem 14, and thus to filler cap 3. The fit of ball bearings 16 into groove 17 allows the entire blocking plate assembly 100 including blocking plate 1 and lock 2 to rotate freely a full 360° on filler cap 3.

Figure 5A:
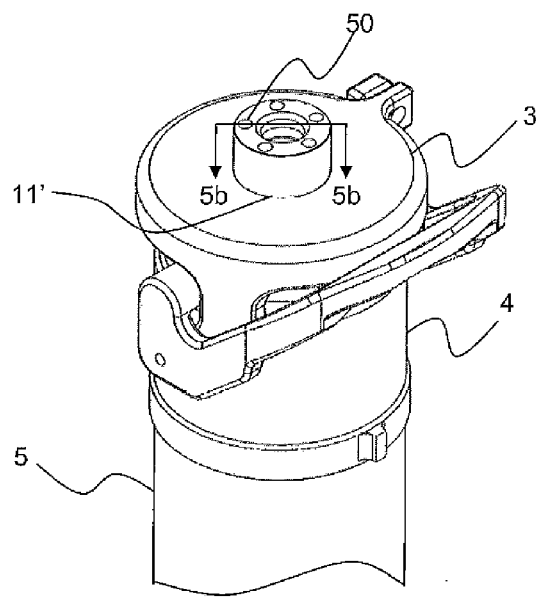
FIG. 5a illustrates an isometric view of an exemplary present stand pipe and filler cap assembly including a lock housing secured to the filler cap, in accordance with an exemplary configuration of the present subject matter.
Figure 5B:
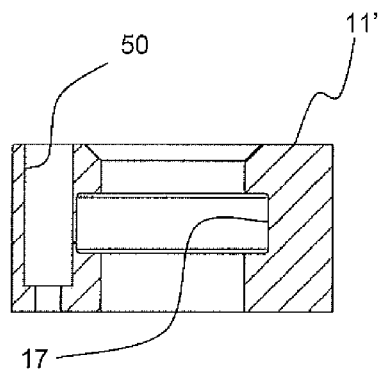
FIG. 5b illustrates a cross section of the present exemplary lock housing illustrated in present FIG. 5a, taken along line 5b-5b thereof.
Figure 6A:
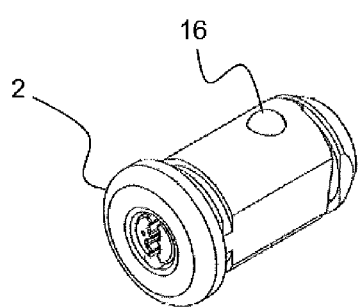
FIGS. 6a and 6b illustrate, respectively, isometric and cross section views of a present lock assembly in accordance with an exemplary embodiment of the present subject matter illustrating a lock employing a pair of ball bearings as a locking mechanism.
Figure 6B:
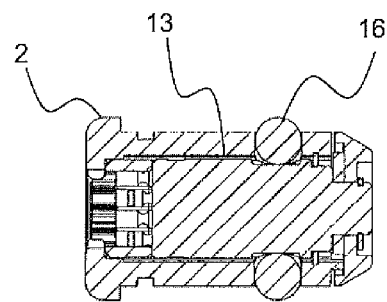

With reference now to FIGS. 5a and 5b, a second exemplary embodiment of the present subject matter will be described. FIG. 5a illustrates an isometric view of a present exemplary stand pipe and filler cap assembly including a lock housing 11' secured to the filler cap 3 in accordance with a second exemplary embodiment of the present subject matter. FIG. 5b illustrates a cross section of the lock housing 11' illustrated in FIG. 5a taken along section line 5b-5b thereof. As may be seen from an inspection of lock housing 11', such lock housing differs from that of the first embodiment in that a cylindrical housing is provided in which a plurality of screw access holes 50 have been provided around the perimeter thereof. In the illustrated exemplary configuration, five such access holes have been provided, although such number is not a specific limitation of the present subject matter, so that alternatively, per present subject matter, an either greater number or fewer number of access holes may be provided.

Figure 8:
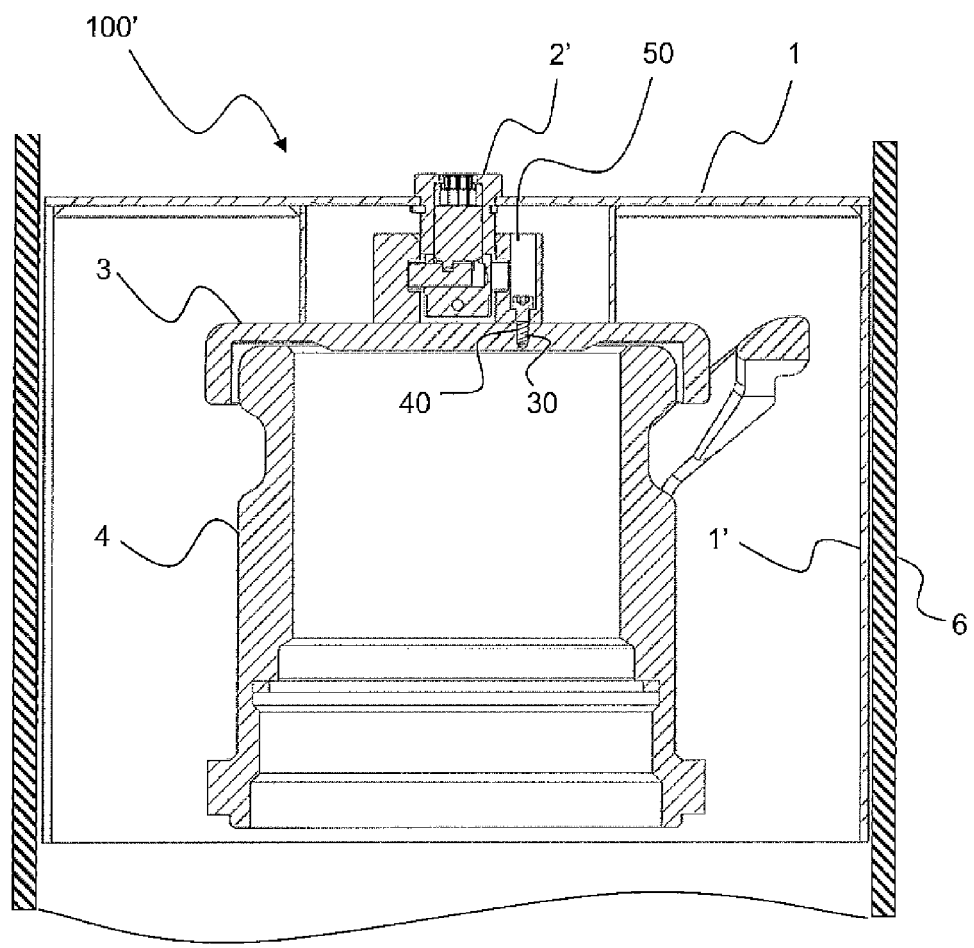
FIG. 8 illustrates a second embodiment of the present exemplary blocking plate assembly of the present subject matter, and wherein a skirt portion is added to the blocking plate illustrated in present FIGS. 1 through 4.

With introductory reference to FIG. 8, it will be seen that in such second exemplary embodiment of the present subject matter, filler cap 3 may be provided with a plurality of tapped holes 30 equal in number and spacing to the access holes 50 provided in lock housing 11'. In such manner, lock housing 11' may be secured to filler cap 3 by way of a similar plurality of threaded screws 40.

Referring to FIG. 5b, it will be seen that lock housing 11', in a manner similar to the first embodiment of the present subject matter, includes a recessed groove 17 in which a locking member may be inserted to retain blocking plate assembly 100 coupled to filler cap 3 in a manner similar to that described with respect to the first embodiment of the present subject matter.

With reference now to FIGS. 6a, 6b and 7a, 7b, there are illustrated for comparison two embodiments of locks 2, 2' as may be variously employed in carrying out embodiments of the present subject matter. It should be understood by those of ordinary skill in the art that such locks are intended to represent exemplary lock configurations, and that the use of other types of locks may be contemplated, and included with the present subject matter. Specifically, representations of lock 2 are illustrated in present FIGS. 6a and 6b as previously described. Such lock 2 employs an inner cylinder 13 that cooperates with a pair of ball bearings 16 such that, upon rotation of inner cylinder 13 through the use of an appropriate key (not illustrated), ball bearings 16 may be forced into groove 17 of housing 11, as previously described.

Figure 7A:
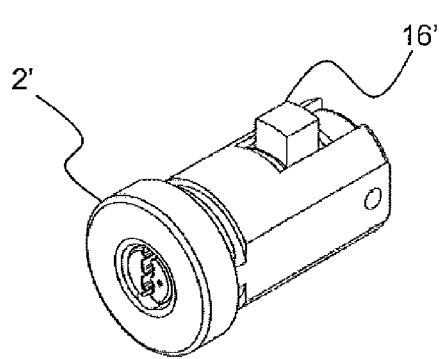
FIGS. 7a and 7b illustrate, respectively, isometric and cross section views of a present lock assembly in accordance with another exemplary embodiment of the present subject illustrating a lock employing a single bolt as the locking mechanism.
Figure 7B:
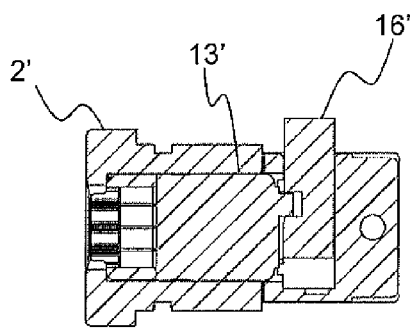

In accordance with a second configuration, lock 2' as illustrated in present FIGS. 7a, 7b is provided with a bolt 16' that may be alternately extended and retracted by operation of inner cylinder 13' upon insertion of an appropriate key (not illustrated) into lock 2' and appropriate rotation of such key.

In both such present exemplary lock configurations, blocking plate assembly 100 is able to rotate freely upon filler cap 3 through cooperation of recessed groove 17 with either the ball bearings 16 of the first exemplary lock embodiment or with bolt 16' of the second present exemplary embodiment.

With further reference to FIG. 8, there is illustrated a second embodiment of a blocking plate assembly generally 100' wherein a skirt portion 1' is added to the blocking plate 1, when compared with what is otherwise illustrated in present FIGS. 1 through 4. Skirt portion 1' is either attached to or integrally formed with the perimeter of blocking plate 1 and extends within well housing 6 a distance sufficient, in cooperation with blocking plate 1, to cover at least a portion of filler cap 3 and, optionally, to cover at least a portion of coupling 4. In alternate present exemplary embodiments of the present subject matter, skirt 1' may be extended to also cover a portion of standpipe 5.

It should be appreciated that, although the embodiment of FIG. 8 illustrates the use of the second embodiment of the lock configuration, that is, the lock configuration employing bolt 16', such is not a limitation associated with the use of skirt 1' together with blocking plate 1. Rather, the present blocking plate 1 and alternative skirt 1' combination may be employed with any lock structure as herein illustrated or alternatively supplied, so long as the supplied lock permits free rotation of the blocking plate 1 and lock upon filler cap 3 (with or without inclusion of skirt 1').

Figure 9:
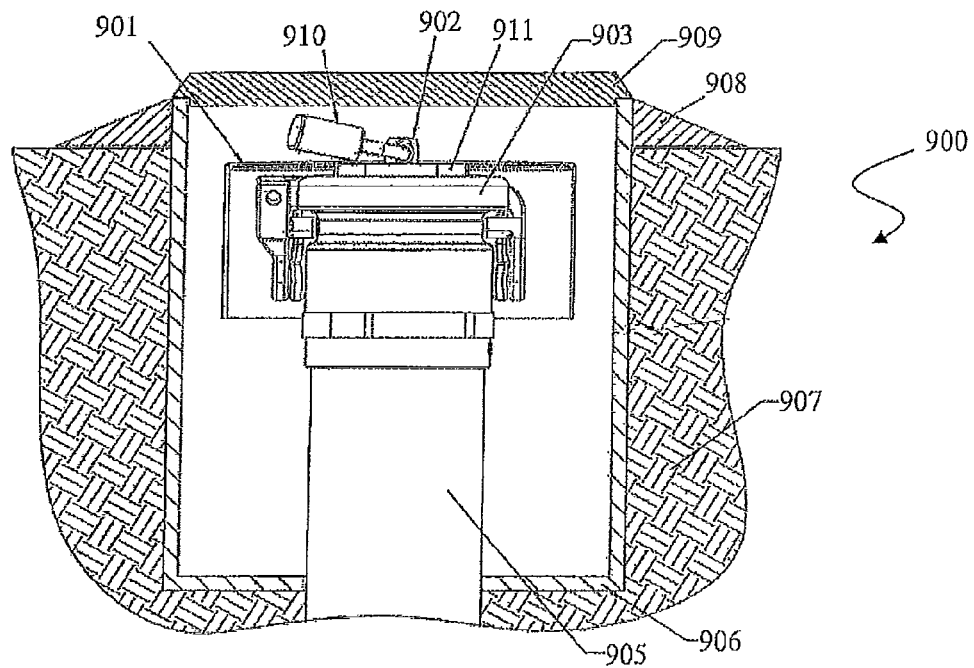
FIG. 9 illustrates a third embodiment to the present exemplary blocking plate assembly of the present subject matter, and wherein a padlock is employed to secure the blocking plate assembly.
Figure 10:
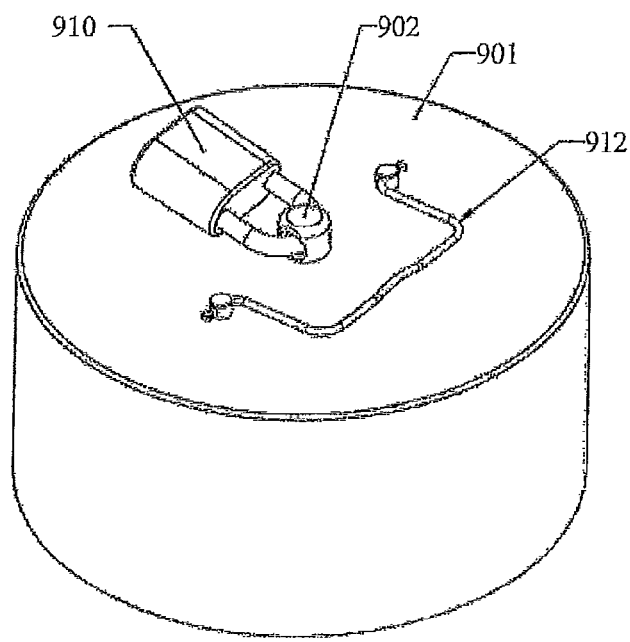
FIG. 10 is a top oblique view of the blocking plate and padlock assembly of present FIG. 8.
Figure 11:
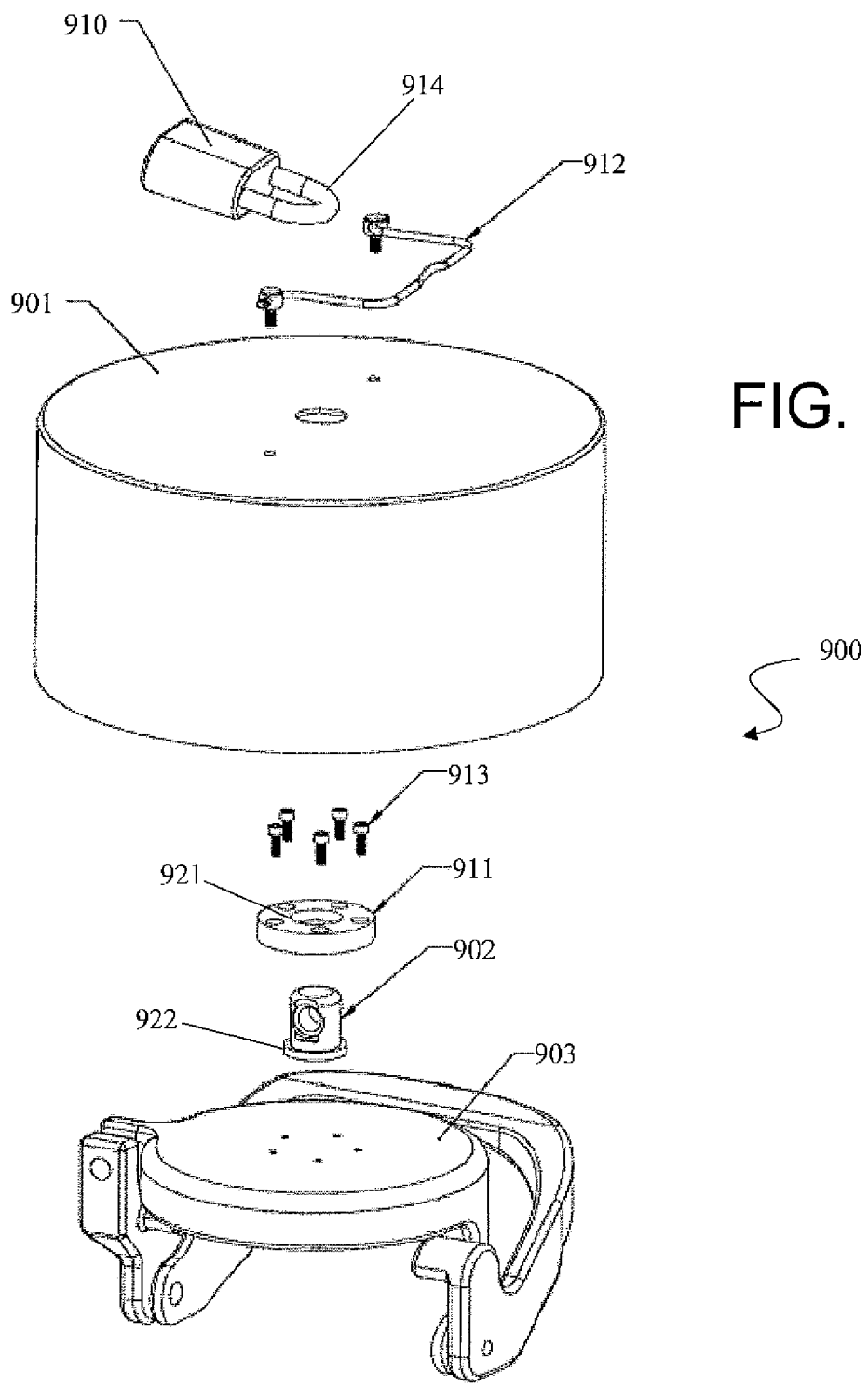
FIG. 11 is an exploded view of the blocking plate and stand pipe adapter of present FIGS. 9 and 10 in accordance with present subject matter.

A third embodiment of the present subject matter is described herein with reference to present FIGS. 9-11. FIG. 9, generally similar to present FIG. 1, illustrates a typical underground storage tank installation in combination with an exemplary locking sleeve assembly generally 900 in accordance with present technology. In a manner similar to that illustrated in FIG. 1, standpipe 905 is enclosed in well housing 906 and back filled, such as with concrete, earth, and/or other filler material 907. Well housing 906 is also provided with a flange 908 and capped with a cover 909.

As illustrated in FIG. 9, as well as in views in FIGS. 10 and 11, present exemplary locking sleeve assembly generally 900 corresponds to a locking sleeve 901 that is provided with a padlock type lock 910. Locking sleeve 901 generally corresponds to blocking plate 1 and alternative skirt 1' illustrated in present FIG. 8 although in certain embodiments, the skirt portion of locking sleeve 901 may not require as large a diameter as illustrated in FIG. 8. Of course, for additional security, locking sleeve 901 may be constructed to provide a diameter more similar to that illustrated in FIG. 8 in conjunction with skirt 1'.

Lock 910 is preferably secured to a swivel boss 902 mounted by way of cap boss 911 to filler cap 903. Cap boss 911 may be secured to filler cap 903 with a plurality of screws 913 as illustrated in FIG. 11 or by any other suitable means including, without limitation, riveting, bolting and welding. Such cap boss 911 is secured to filler cap 903 in such a manner that when assembled only the swivel boss 902 is visible above the upwardly-facing surface of locking sleeve 901. A shackle 914 of lock 910 is configured to be passed through a hole in swivel boss 902 to secure locking sleeve 901 to the top of filler cap 903.

It will be seen from present FIG. 11 that swivel boss 902 includes a lip portion 922 that is configured to engage the lower surface of cap boss 911 such that swivel boss 902 is retained in hole 921 but in a freely moving engagement therewith, thus preventing the unscrewing of the entire assembly from the standpipe 905.

As shown in FIGS. 10 and 11, a handle 912 may be secured by any suitable means to the top of locking sleeve 901 to facilitate lifting of the locking sleeve 901 from blocking access to filler cap 903 upon removal of lock 910. Finally, it should be appreciated by those of ordinary skill in the art that while a padlock type lock has been particularly described and illustrated, it is to be understood that any type of locking device including keyed and/or combination type locks may be employed in this embodiment of the present subject matter, so long as the lock includes a shackle like portion similar to that of padlock 910.

Figure 12:
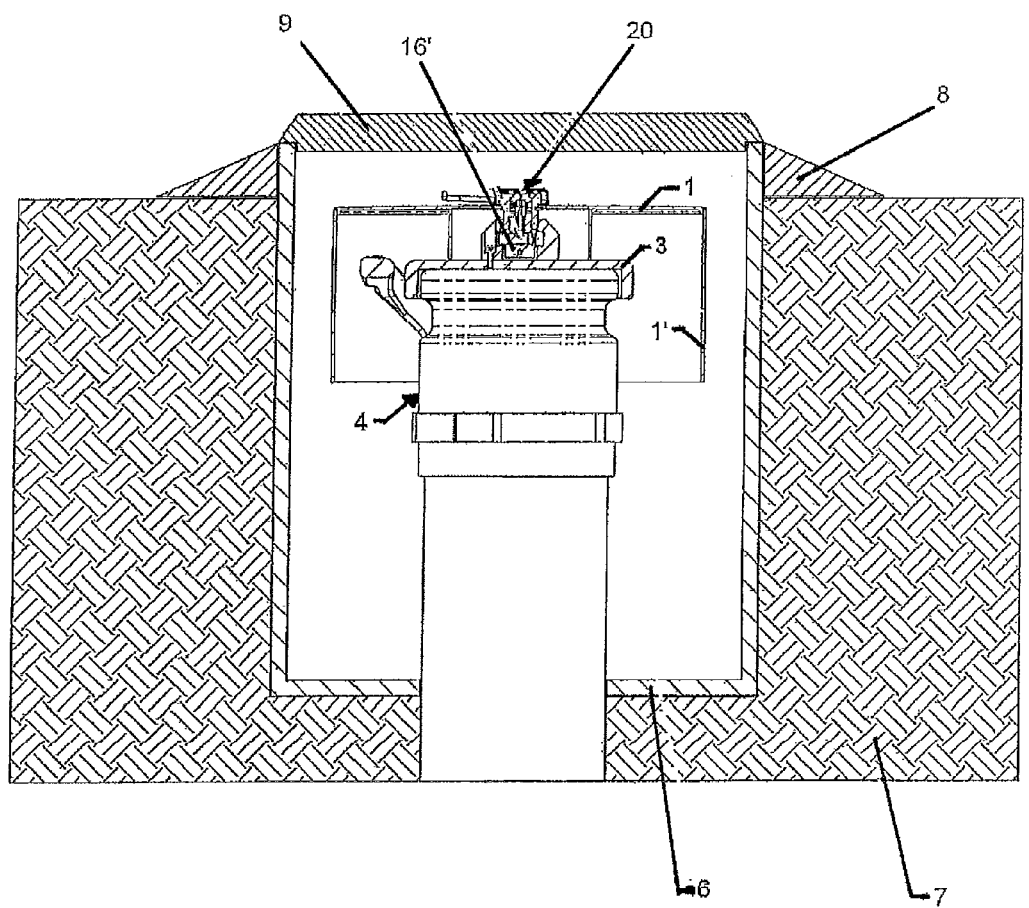
FIG. 12 illustrates an exemplary underground storage tank installation including an exemplary locking plate assembly with a deadbolt thereof. In an extended position, in accordance with present technology.
Figure 13:
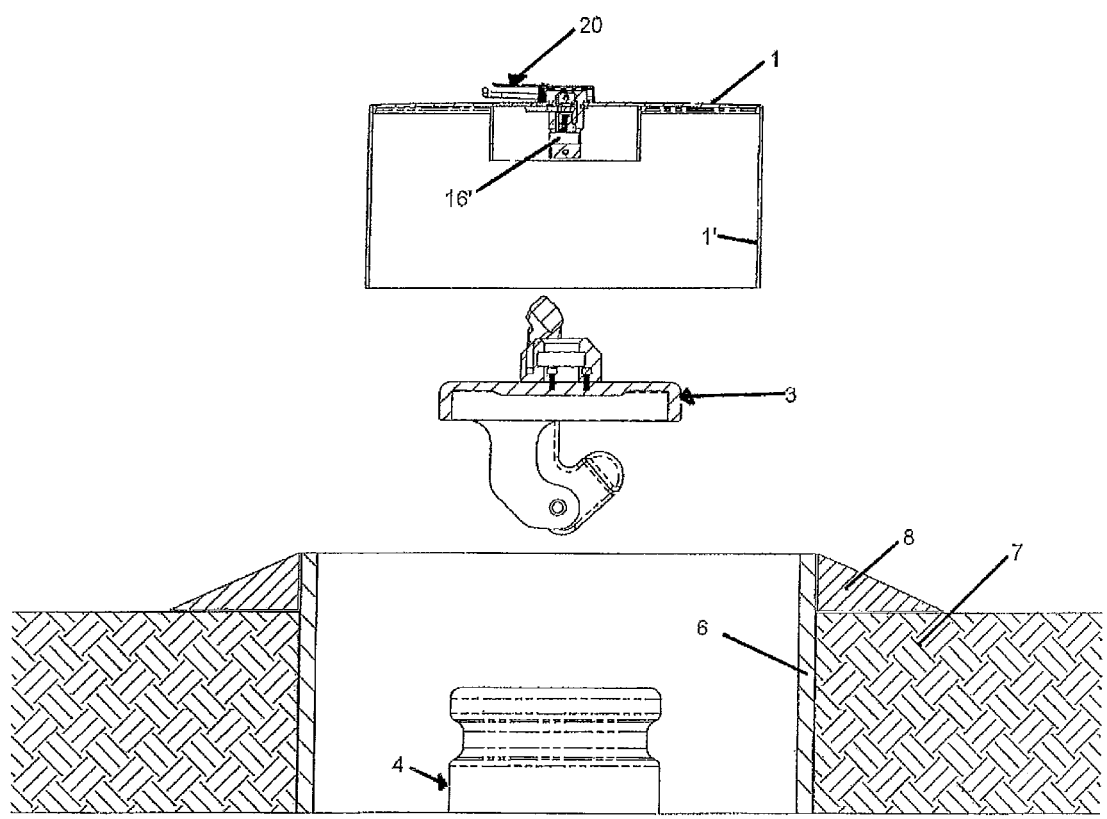
FIG. 13 illustrates an exploded view of the subject matter of present FIG. 12, with a deadbolt thereof in a retracted position, in accordance with present technology.

Present FIG. 12 illustrates an exemplary embodiment of the present subject matter, wherein a representative deadbolt 16' is in an extended position thereof. More particularly, a blocking plate 1 has an extended skirt 1', which cooperates relative to well housing 6, filler 7, flange 8, cover 9, coupling 4, and cap 3, as otherwise discussed herein above. Cap ("dust cap") 3 is in its locked position, and lock dust cover 20 is closed. Present FIG. 13 is an "unlocked" and exploded illustration of present FIG. 12, wherein deadbolt 16' is in a retracted position thereof in accordance with the present subject matter. Additionally, the components are separated, the sleeve assembly including such as locking plate 1 and depending skirt 1' are removed, such that dust cap 3 with a screw-attached boss is removed. Lock dust cover 20 is illustrated as opened, whereby a key (not shown) or equivalent may have been used for unlocking the subject structure. In such position, the underground tank may be accessed for entry of liquid (such as fuel) or removal thereof, as well understood by those of ordinary skill in the art.

While the present subject matter has been described in detail with respect to specific embodiments thereof, it will be appreciated that those skilled in the art, upon attaining an understanding of the foregoing, may readily produce alterations to, variations of, and/or equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A locking mechanism for securing access to a storage tank of the type having a filler cap, comprising:
    a boss secured to a filler cap of an associated storage tank;
    a blocking plate; and
    a locking assembly, for selectively securing said blocking plate to said boss, such that said blocking plate selectively physically blocks access to such filler cap, whereby access to the associated storage tank is protected.

2. A locking mechanism as in claim 1, wherein said boss includes a cap stem with a projecting threaded member, and a nut, cooperating with an opening formed in an associated filler cap, for securement thereto.

3. A locking mechanism as in claim 2, wherein:
    said cap stem defines an annular groove; and
    said locking mechanism includes at least two rotatable ball bearings received in said annular groove, such that said blocking plate is secured in a free spinning position relative to such associated filler cap, so as to prevent unauthorized displacement of such filler cap.

4. A locking mechanism as in claim 1, wherein said boss includes a base member defining a plurality of screw access openings therethrough, and a corresponding plurality of screws, cooperating with corresponding screw-receiving openings formed in an associated filler cap, for securement thereto.

5. A locking mechanism as in claim 1, wherein said locking assembly further includes a rotatable interface for said blocking plate, such that said blocking plate is secured in a free spinning position relative to such associated filler cap, so as to prevent unauthorized displacement of such filler cap.

6. A locking mechanism as in claim 5, wherein:
    said blocking plate defines an opening therethrough;
    said locking assembly includes a housing body receivable below said blocking plate, and a lock receivable through said blocking plate opening for securement of said blocking plate to an associated filler cap; and
    said rotatable interface includes at least one retaining bolt.

7. A locking mechanism as in claim 6, wherein:
    said boss includes a cap stem with a projecting threaded member, and a nut, cooperating with an opening formed in an associated filler cap, for securement thereto; and
    said locking mechanism further includes a spring clip interconnecting said cap stem with said housing body.

8. A locking mechanism as in claim 1, wherein said boss comprises a free moving swivel boss attached to such associated filler cap, such that said blocking plate is secured in a free spinning position relative to such associated filler cap, so as to prevent unauthorized displacement of such filler cap.

9. A locking mechanism as in claim 8, further including a padlock with movable shackle, for cooperating with said swivel boss, for rotatable securement of said blocking plate relative to such associated filler cap.

10. A locking mechanism as in claim 1, wherein said blocking plate further includes a depending skirt for extending to cover portions of an associated filler cap.

11. A locking mechanism as in claim 1, further including a handle secured to said blocking plate to facilitate removal thereof from an associated filler cap.

12. A rotatable locking mechanism for securing access to an underground fuel storage tank of the type having a standpipe topped by a removable filler cap, comprising:
    a boss secured to a filler cap of an associated storage tank;
    a blocking plate for physically blocking access to such standpipe and removable filler cap associated with an underground storage tank; and
    a locking assembly, for selectively securing said blocking plate to said boss, such that said blocking plate physically blocks access to such filler cap, whereby access to the associated storage tank is protected;
    wherein said locking assembly further includes a rotatable interface for said blocking plate, so that said blocking plate is secured in a free spinning position relative to such associated filler cap, so that such blocking plate is rotatable without causing any corresponding displacement of an associated filler cap.

13. A rotatable locking mechanism as in claim 12, wherein:
    said blocking plate defines an opening therethrough; and said locking assembly includes a housing body receivable below said blocking plate, and a lock receivable through said blocking plate opening for securement of said blocking plate to an associated filler cap.

14. A rotatable locking mechanism as in claim 12, wherein:
said boss includes a cap stem with a projecting threaded member, and a nut, cooperating with an opening formed in an associated filler cap, for securement thereto;
said cap stem defines an annular groove; and
said locking mechanism further includes at least two rotatable ball bearings received in said annular groove, such that said blocking plate is secured in a free spinning position relative to such associated filler cap, so as to prevent unauthorized displacement of such filler cap.

15. A rotatable locking mechanism as in claim 12, wherein:
said boss includes a base member defining a plurality of screw access openings therethrough, and a corresponding plurality of screws, cooperating with corresponding screw-receiving openings formed in an associated filler cap, for securement thereto; and
said rotatable interface includes at least one retaining bolt.

16. A rotatable locking mechanism as in claim 13, wherein:
said boss includes a cap stem with a projecting threaded member, and a nut, cooperating with an opening formed in an associated filler cap, for securement thereto; and
said rotatable locking mechanism further includes a spring clip interconnecting said cap stem with said housing body.

17. A rotatable locking mechanism as in claim 12, wherein:
said boss comprises a free moving swivel boss attached to such associated filler cap, such that said blocking plate is secured in a free spinning position relative to such associated filler cap, so as to prevent unauthorized displacement of such filler cap; and
said rotatable locking mechanism further includes a padlock with movable shackle, for cooperating with said swivel boss, for rotatable securement of said blocking plate relative to such associated filler cap.

18. A rotatable locking mechanism as in claim 12, wherein:
said blocking plate further includes a depending skirt for extending to cover portions of an associated filler cap; and
said rotatable locking mechanism further includes a handle secured to said blocking plate to facilitate removal thereof from an associated filler cap.

19. Methodology for securing access to a storage tank of the type having a filler cap, comprising:
securing a boss to the filler cap of a storage tank;
providing a blocking plate; and
selectively securing such blocking plate to such boss through use of a locking assembly, such that such blocking plate selectively physically blocks access to such filler cap, whereby access to the associated storage tank is protected.

20. Methodology as in claim 19, further including:
providing an opening in the filler cap;
providing such boss so as to include a cap stem with a projecting threaded member, and a nut; and
securing such nut to such projecting threaded member with such threaded member cooperating with the opening in the associated filler cap.

21. Methodology as in claim 20, further including:
providing such cap stem with an annular groove; and
providing at least two rotatable ball bearings received in such annular groove, such that such blocking plate is secured in a free spinning position relative to such associated filler cap, so as to prevent unauthorized displacement of such filler cap.

22. Methodology as in claim 19, further including:
forming a plurality of screw-receiving openings in the filler cap;
providing such boss so as to include a base member defining a plurality of screw access openings therethrough, and a corresponding plurality of screws; and
securing such plurality of screws to such filler cap respectively through such screw access openings.

23. Methodology as in claim 19, further including providing a rotatable interface for such blocking plate, such that such blocking plate is secured in a free spinning position relative to such associated filler cap, so as to prevent unauthorized displacement of such filler cap.

24. Methodology as in claim 23, further including:
providing an opening through such blocking plate;
providing a housing body below such blocking plate;
securing a lock to such housing body through such blocking plate opening for securement of such blocking plate to the associated filler cap; and
providing at least one retaining bolt in conjunction with such rotatable interface.

25. Methodology as in claim 24, further including:
providing an opening in the filler cap;
providing such boss so as to include a cap stem with a projecting threaded member, and a nut;
securing such nut to such projecting threaded member with such threaded member cooperating with the opening in the associated filler cap; and
interconnecting such cap stem with such housing body with a spring clip.

26. Methodology as in claim 19, further including:
providing a free moving swivel boss attached to the filler cap; and
providing a padlock with movable shackle, for cooperating with such swivel boss, for rotatable securement of such blocking plate relative to the filler cap, such that such blocking plate is secured in a free spinning position relative to the filler cap, so as to prevent unauthorized displacement of such filler cap.

27. Methodology as in claim 19, further including providing such blocking plate with a depending skirt for extending to cover portions of the filler cap.

28. Methodology as in claim 19, further including securing a handle to such blocking plate to facilitate removal thereof from the filler cap.

* * * * *